Patented May 10, 1949

2,470,077

UNITED STATES PATENT OFFICE 2,470,077

PHENYLETHYL SULFONES

John K. Fincke, Dayton, Ohio, assignor to Monsanto Chemical Company, St. Louis, Mo., a corporation of Delaware No Drawing. Application February 12, 1948,
Serial No. 8,011

3 Claims. (Cl. 260—607)

The present invention provides new phenylethyl sulfones having the following formula:

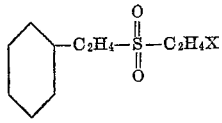

where X is selected from the group of negative constituents consisting of Cl and OH.

By reason of the presence of the sulfone group in the β position with respect to the chlorine and hydroxy radicals the latter substituents are both highly reactive.

The following examples will serve to illustrate this invention:

Example 1

β-Hydroxyethyl β'-phenylethyl sulfone.— 20 grams (0.11 mole) of β-hydroxyethyl β'-phenylethyl thioether, as prepared in Example 1 of my copending application, filed on even date herewith, was dissolved in glacial acetic acid. 80 cc. of 30% $H_2O_2$ was added to the solution, which then became quite warm. The solution was allowed to stand for four hours, after which time it was poured into one liter of water, the acid neutralized with caustic soda. The neutral aqueous solution was then extracted with ether and a crop of white crystals obtained from the ether. The crude crystals were purified by recrystallization from a mixture of benzene and hexane. This compound is characterized by possessing a faint wine-like odor. M. P. 66–67.5° C. Sulfur: Found 14.91%; theory 14.93%. It may be employed as an ingredient in perfumes.

Example 2

β-Chloroethyl β'-phenylethyl sulfone.— 80 grams of β-chloroethyl β'-phenylethyl thioether, prepared according to Example 2 of my copending application filed on even date herewith, was dissolved in 150 cc. of glacial acetic acid and then treated with one mole of 30% $H_2O_2$. Some heat was initially developed by the reaction; however, after cooling, the solution was boiled a short time. Upon cooling, the solution became almost solid. Distilled water was then added to the product, filtered and pressed dry on a Buchner funnel. The damp product so obtained was dissolved in 300 cc. of absolute ethyl alcohol, cooled, and filtered. The crystals obtained were dried in a vacuum at 45° C. Yield 86%, M. P. 114–115.5° C.

The present products may be employed for insecticidal or germicidal properties. They may also be employed as additives for addition to lubricating oils for the purpose of inhibiting the oxidation of such oils. When so employed, these materials are added to petroleum or other oxidizable oils in small amounts usually from 0.1% to 5% by weight based on the oil.

What I claim is:
1. The compounds having the formula:

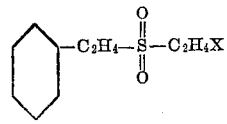

where X is selected from the group consisting of Cl and OH.
2. β-Chloroethyl β'-phenylethyl sulfone.
3. β-Hydroxyethyl β'-phenylethyl sulfone.

JOHN K. FINCKE.

No references cited.